Feb. 10, 1942. T. BROWN Re. 22,019

CONTROLLING MECHANISM FOR AGRICULTURAL IMPLEMENTS

Original Filed Sept. 30, 1939 4 Sheets-Sheet 1

INVENTOR:
Theophilus Brown
BY C. E. Boff and R. C. Johnson
ATTORNEYS.

Feb. 10, 1942. T. BROWN Re. 22,019

CONTROLLING MECHANISM FOR AGRICULTURAL IMPLEMENTS

Original Filed Sept. 30, 1939 4 Sheets-Sheet 2

INVENTOR:
Theophilus Brown
BY R. C. Johnson
ATTORNEYS.

Feb. 10, 1942. T. BROWN Re. 22,019

CONTROLLING MECHANISM FOR AGRICULTURAL IMPLEMENTS

Original Filed Sept. 30, 1939 4 Sheets-Sheet 3

INVENTOR:
Theophilus Brown
BY E. C. Griffith R. C. Johnson
ATTORNEYS.

CONTROLLING MECHANISM FOR AGRICULTURAL IMPLEMENTS

Original Filed Sept. 30, 1939 4 Sheets-Sheet 4

INVENTOR:
Theophilus Brown
BY
ATTORNEYS.

Reissued Feb. 10, 1942

Re. 22,019

UNITED STATES PATENT OFFICE 22,019

CONTROLLING MECHANISM FOR AGRICULTURAL IMPLEMENTS

Theophilus Brown, Moline, Ill., assignor to Deere & Company, Moline, Ill., a corporation of Illinois Original No. 2,249,807, dated July 22, 1941, Serial No. 297,330, September 30, 1939. Application for reissue September 26, 1941, Serial No. 412,520

56 Claims. (Cl. 97—50)

The present invention relates generally to agricultural implements and more particularly to tractor mounted tools of the ground working type such as plows, listers and the like. More particularly, the present invention is concerned with agricultural machines in which the depth of operation of the tool or tools is controlled by a gauge wheel and in which the tractor is provided with power lift mechanism for raising the tools into transport position.

The object and general nature of this invention is the provision of means controlled by the tractor power lift mechanism for controlling the working depth of the tool. Heretofore, so far as I am aware, the tractor power lift mechanism has been employed solely to raise the tool into transport position or lower it into working position. A feature of this invention is the provision of an agricultural machine having power lift mechanism so connected with the implement gauging means that the first or initial range of raising movement serves to raise the tool or tools relative to the gauge wheel while the remaining raising movement of the power lift mechanism serves to raise or lift both the tool and the gauging means out of contact with the ground. More specifically, the present invention has for its object the provision of means for controlling the depth of implement tool means by means of a power lift mechanism of the double acting hydraulic type which can be moved to and locked in any intermediate position as well as in a completely raised or completely lowered position, and in this connection it is a further feature of the present invention to employ a hydraulic double acting power lift so that the lower part of the lift is used to control the depth while the upper part of the lift is utilized for raising the implement into its transport position.

Another feature of the present invention is the provision of means for controlling the depth of an integral implement, such as a plow, by means of the tractor power lift mechanism which is connected to a gauge wheel or other unit arranged to follow the ground independently of the tractor and operatively connected therewith so that the power lift connections maintain the plow beam and gauge wheel in the desired adjusted relation, regardless of movement of both the gauge wheel and the tool beam relative to the tractor. Hence, while the power lift mechanism on the tractor is operatively connected, first, to position the gauge wheel relative to the tool means to determine the depth of operation thereof and, second to raise both the tool means and the gauge wheel off the ground, yet the gauge wheel in normal working position remains in adjusted relation with respect to the tool means and can follow inequalities of the ground traversed with the consequence that the depth of plowing remains uniform. So far as I am aware, it is broadly new to provide an implement of this kind which is gauged, not from the tractor, but from the ground surface, yet has its depth of operation controlled by mechanism on the tractor, which mechanism is also arranged to raise the unit into its transport position.

One specific feature of the present invention resides in the provision of a single member on the tractor operatively connected through a first linkage for adjusting the depth of operation and then operative through a related linkage to raise the tool into transport position, each linkage so constructed and arranged that each is permitted to perform its prescribed function without interference from the other. In other words, the power lift connections are so arranged that during the depth adjusting range the gauge wheel is moved downwardly relative to the tool beam and in the lifting range of the tool beam is raised but the gauge wheel is prevented from further downward movement relative to the tool beam, to any material extent.

Another important feature of the present invention is the provision of means associated with a hydraulic lift mechanism for automatically returning the implement to a given operating depth, which can be adjusted, after the implement and the gauging means thereof has been raised into lifted or transport position. Briefly, according to the present invention, such means includes an operating member for the hydraulic power lift valve, with a part mounted for adjustment thereon and operatively connected with the lowering mechanism whereby when the plow or other tool has been lowered to a given point relative to the gauge wheel, the hydraulic power lift controlling valve is automatically returned to a position locking the hydraulic mechanism against further movement.

These and other objects and advantages of the present invention will be apparent to those skilled in the art after a consideration of the following detailed description of the preferred structural embodiments, taken in conjunction with the accompanying drawings.

In the drawings:

Figure 1 is a perspective view of the rear end of a tractor having a hydraulic lift of the double acting locking type and serving as the propelling unit for a plow of the integral type having an adjustable gauge wheel which is operatively connected with the tractor power lift mechanism so that the latter may be utilized for gauging the depth of operation of the tool and also raising the latter and the gauge wheel into transport position;

Figure 1:
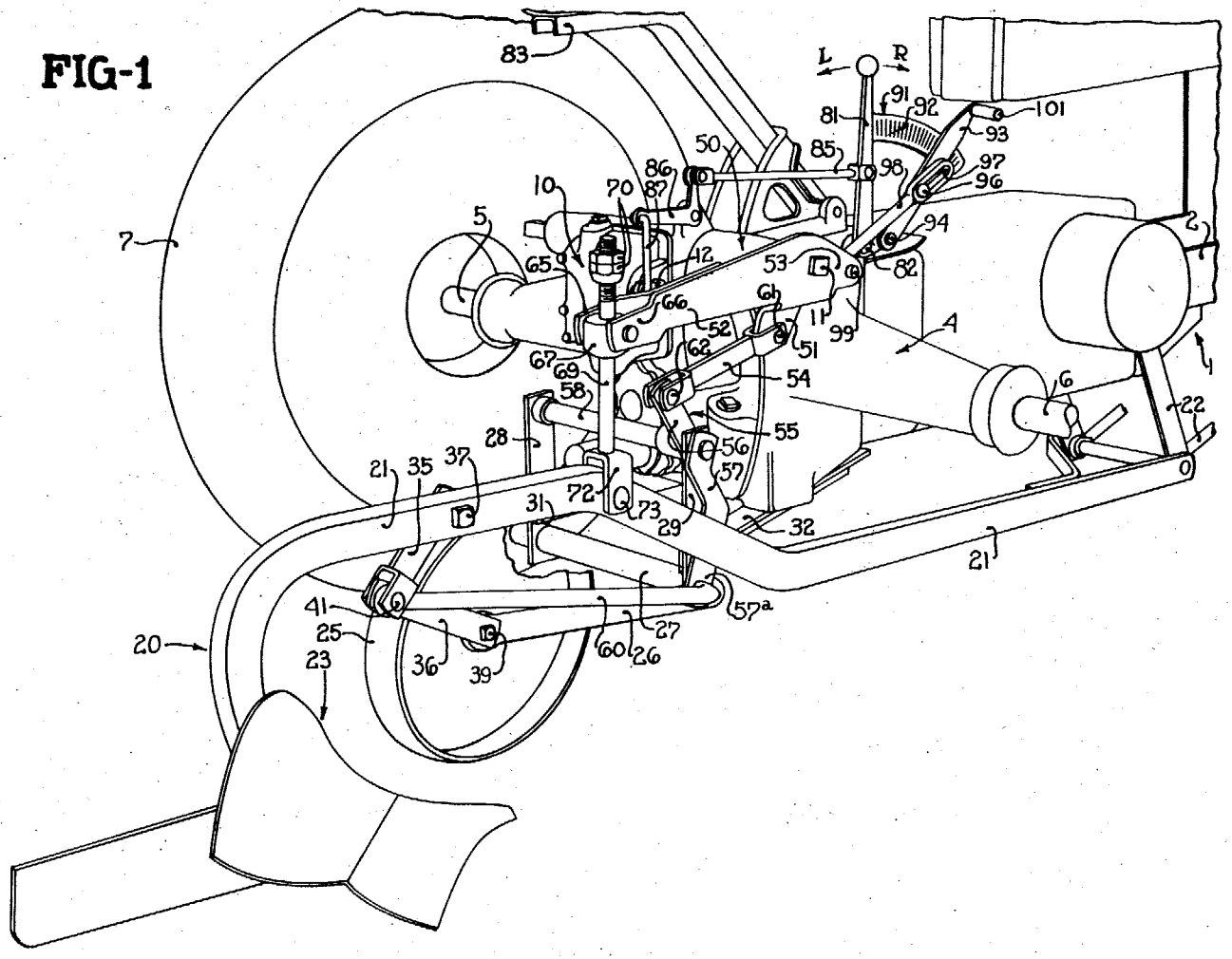

Referring now to the drawings, more particularly to Figures 1–5, inclusive, the tractor which serves as an implement or supporting frame is indicated in its entirety by the reference numeral 1 and includes a frame 2, a motor 3 and a rear axle structure 4, the latter including axle shafts 5 and 6 upon which the rear traction wheels 7 of the tractor are mounted. In Figure 1, the near rear wheel is removed so as to show the power lift connections. The power lift of the tractor is indicated generally by the reference numeral 10 and is of the hydraulic type which includes a rock shaft 11 actuated by suitable hydraulic mechanism under the control of suitable valve means having a valve actuating arm 12. Preferably, the hydraulic mechanism includes a pump driven from the tractor motor, a double acting cylinder and piston arrangement for rocking the shaft 11 from one position to the other under the control of the valve means at 12. The power lift mechanism indicated at 10 may take the general form of the power lift mechanism disclosed in my prior Patent 2,197,848, dated April 23, 1940, and this is the general form of hydraulic lift mechanism shown by way of illustration in the drawings, with the exception that the feature of automatically actuating the valve into either of its fully raised or fully lowered positions has been omitted and the valve means arranged so that it may be moved into an intermediate position, locking the piston in any position in its cylinder against movement in a downward direction, along the lines of the hydraulic power lift shown in the patent to Harold Brown, No. 1,929,804, issued October 10, 1933. Obviously, of course, any other suitable form of power lift mechanism, either double- or single-acting, may be employed in the present invention, so long as such mechanism is of the type which may be raised or lowered, as desired, or held in any intermediate position, in any suitable manner as by moving a valve lever, such as 12, from a neutral or locked position into either of two operative positions.

The integral implement chosen to illustrate the principles of the present invention embodies a plow 20 including a plow beam 21 connected by hitch means 22 to the forward portion of the tractor 1 and carrying at its rear end a plow bottom 23. According to the principles of the present invention the depth of operation of the plow bottom 23 is controlled by a gauge wheel 25 journaled for rotation on the rear end of a swinging link 26, the laterally directed forward end 27 of which is mounted for general vertical rocking movement and generally lateral shifting movement in a pair of vertical standards 28 and 29 which are connected in any suitable manner to a pair of brackets 31 and 32 secured, as at 33, to the rear axle of the tractor, preferably to the under side of the enlarged central portion of the rear axle housing 4. By virtue of this construction the gauge wheel 25 is attached to the tractor yet can follow variations of the ground surface independent of the tractor. Also, when the plow beam swings laterally, a small amount of which is permitted by the draft connections 22, the gauge wheel 25 follows the plow beam since the end 27 can shift laterally in the standards 28 and 29.

Figure 2:
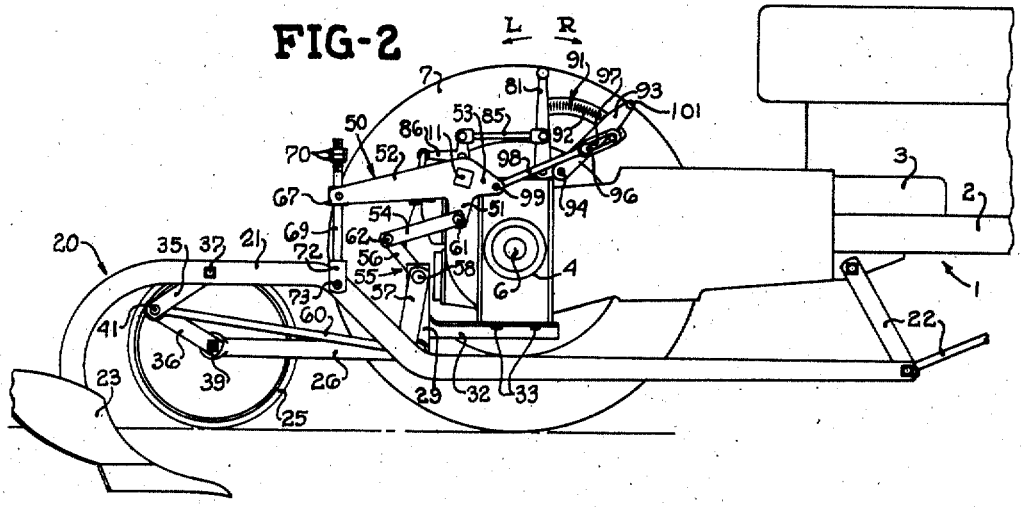
Figure 2 is a side view of the machine shown in Figure 1, the plow being illustrated in a deep plowing position.
Figure 3:
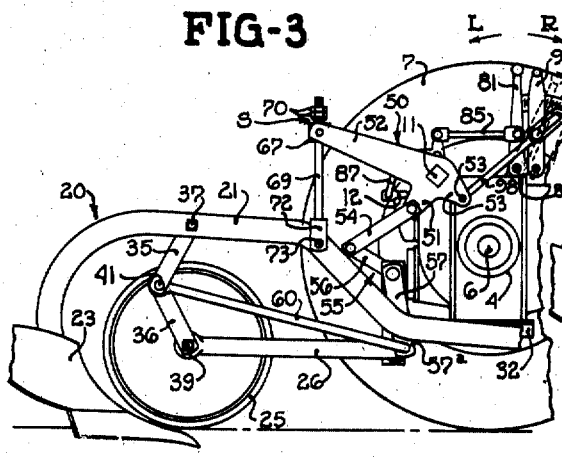
Figure 3 is a view similar to Figure 2, showing the plow in shallow plowing position, Figures 2 and 3 showing the amount of movement of the power lift mechanism utilized for the depth controlling operation.

The position of the gauge wheel 25 relative to the plow beam 21 is controlled by connections therebetween which include a pair of toggle links or arms 35 and 36. The link or arm 35 is pivoted to the beam 21 by a bolt or other means 37, and the lower link or arm 36 is pivoted to the swinging link or crank axle 26 by means of a bolt or other means 39, preferably arranged on the axis of rotation of the gauge wheel 25. The two arms or links 35 and 36 are pivotally interconnected by means of a pin or other means 41, as best indicated in Figures 2 and 3. When the toggle arms or links 35 and 36 are moved into collapsed position (Figure 2) the gauge wheel 25 is nearest the plow beam 21, and hence the plow bottom 23 is arranged for deep plowing. When the toggle arms or links 35 and 36 are extended (Figure 3) the gauge wheel 25 is farthest from the plow beam 21 and hence the plow bottom 23 is arranged for shallow plowing.

The connections, which are operated by the power lift mechanism 10 referred to above, for swinging the arms or links 35 and 36 so as to move the gauge wheel 25 relative to the plow beam 21 to control the depth of plowing, will now be described.

An arm or bell crank 50 is secured to one end of the rock shaft 11, which forms a part of the power lift mechanism 10, and is provided with three arm sections 51, 52 and 53. The power lift arm 51 is connected by means of a link 54 to a bell crank 55 which consists of an arm 56 rigidly connected to a second arm 57, both being carried on a transverse shaft 58 which is supported at its opposite ends in the upper ends of the vertical standards 28 and 29. The connecting link 54 is pivotally connected at its ends, as at 61 and 62, to the power lift arm 51 and the upper end of the bell crank arm 56. The lower end of the bell crank arm 57, shown at 57a in Figure 1, pivotally receives the forward end of a link 60, the rear end of which is connected by the pivot pin 41 to the toggle links or arms 35 and 36. It will be observed that the lower end 57a of the bell crank arm 57 is disposed closely adjacent the axis of the swinging crank axle section 27 for a purpose that will be explained below. As will be clear from Figure 1, when the power lift mechanism 10 is actuated to swing the arm 51 in one direction or the other, a thrust or a pull is transmitted through the link 54 and the bell crank 55 to the link 60, which swings the arm 35 in one direction or the other and causes the lower link 36 to raise or lower the rear end of the swinging link 26 and the attached gauge wheel 25 relative to the plow beam 21.

The second arm 52 of the power lift bell crank 50 is provided or formed with a pair of yoke sections 65 and 66 which are spaced apart and receive a trunnion 67 therebetween. The member 67 is apertured and slidably disposed about the upper end of a link 69. The upper end of the latter is threaded and receives a pair of lock nuts 70. The lower end of the link 69 is formed or provided with a yoke 72 which is connected by a pivot 73 to the plow beam 21. In the normal operating position, as shown in Figures 1 and 2, the trunnion member 67 is disposed a substantial distance below the lock nuts 70, which construction provides means in the form of a lost motion connection between the plow beam 21 and the power lift mechanism, which construction permits the plow beam 21 and the gauge wheel 25 connected therewith to rise and fall relative to the tractor about the hitch connection 22 at the forward end of the plow beam 21. Thus, the gauge wheel 25 determines the operative position of the plow bottom 23 independently of the position of the tractor. During this rising and falling movement of the plow beam 21 and the gauge wheel 25, the connecting link or crank axle 26 of the latter pivots about the section 27 which is supported for rocking movement on the tractor at the lower ends of the standards 28 and 29. Since the forward end of the link 60, the longitudinal position of which determines the angularity of the toggle arms 35 and 36, and hence the position of the gauge wheel 25 relative to the plow beam 21, is disposed closely adjacent the axis of the crank axle section 27, it will be seen that rising and falling movement of the gauge wheel will occasion very little change in position of the toggle arms 35 and 36, and hence the operating depth of the plow bottom 23 is maintained substantially constant even though the control of the gauge wheel 25 is on the tractor and the plow beam 21 and gauge wheel 25 both move relative to the tractor in following variations in the ground surface.

The actuating mechanism, which forms a part of the present invention, for the power lift comprises a hand lever 81 pivotally mounted as at 82, on the tractor at a point convenient to the operator who usually rides on the seat 83, and the hand lever 81 is connected by a link 85 to one arm of a small bell crank 86, the other arm of which is connected by a link 87 to the valve lever 12. When the lever 81 is in a vertical or intermediate position, the valve means 12 is held in its intermediate position which, through the means referred to above, serves to lock the power lift shaft 11 in the position it occupied at the moment the valve 12 was returned to its intermediate or locked position from a position providing for rocking the shaft 11 in one direction or the other. Preferably, the movement of the hand lever 81 forwardly, or in a clockwise direction as viewed in Figure 2, provides for a raising or clockwise movement of the rock shaft 11, and similarly a rearward or anti-clockwise movement of the hand lever 81 operates the power lift valve means in such a way as to cause the power lift rock shaft 11 to be rocked in an anti-clockwise direction. As explained above, at any point the hand lever 81 can be returned to its intermediate or neutral position, locking the power lift shaft 11 in that position against further movement in either direction.

The operation of the mechanism so far described is substantially as follows:

Referring to Figure 2 where the plow bottom 23 is shown in its deep plowing position, and the valve controlling lever 81 in its intermediate or locked position, it will be seen that the rock shaft 11, which is held against movement in either direction by the power lift mechanism, acts through the link 54, the bell crank 55 and the operating link 60 to hold the toggle links or arms 35 and 36 in the position shown. The angular relation between the power lift arms 51 and 52 is such that in this position of the rock shaft 11 the arm 52 carries the trunnion member 67 well below the lock nuts 70. Hence the implement is free to pivot vertically about the hitch 22 relative to the tractor to follow inequalities in the ground surface and the position of the pivot at the forward end of the link 60 closely adjacent the axis of the gauge wheel link section 27 prevents such movement of the implement relative to the tractor from affecting the position of the gauge wheel 25 relative to the tool beam 21. When it is desired to raise the plow bottom 23 into a shallow plowing position, the valve lever 81 is moved forwardly, or in a clockwise direction as viewed in Figure 2. This opens the valve means 12 and causes the hydraulic power lift mechanism to rock the shaft 11 in a clockwise direction (Figures 2 and 3), and the corresponding movement of the power lift arm 51 exerts a thrust generally rearwardly through the link 54 to rock the bell crank 55 in a counter-clockwise direction (Figure 3), and this exerts a forward pull through the link 60 which moves the toggle links or arms 35 toward their extended or straightened position and thrusting forwardly on the gauge wheel 25 to raise the plow beam 21 relative thereto, as shown in Figure 3. When the gauge wheel is moved relative to the plow beam 21 to the desired extent, the operator returns the valve lever 81 to its neutral position, thereby locking the power lift shaft 11 against further movement and thus holding the gauge wheel in its adjusted position relative to the plow beam 21.

Figure 4:
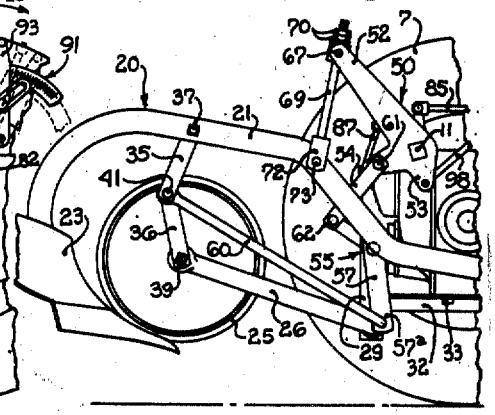
Figure 4 is a view similar to Figures 2 and 3, showing the parts in their relative positions they occupy when the plow is raised into its transport position.

As shown in Figure 3, when the plow bottom 23 is raised to its shallowest position, the trunnion member 67 is raised by the corresponding movement of the power lift arm 52 up to but not in engagement with the nuts 70 at the upper end of the lifting link 69, there being clearance as shown at S to permit the implement to move vertically relative to the tractor in following the ground surface. Upon further actuation of the power lift shaft 11 in a clockwise direction, as by moving the valve lever 81 into or holding it in its raising position, the rear end of the power lift arm 52 will now move up into engagement with the lock nuts 70 and exert a direct upward pull on the plow beam 21 through the lifting link 69, and if the valve lever 81 is held in its raised position for a sufficient length of time, the plow beam 21 will be lifted into its raised or transport position, as shown in Figure 4. While the initial movement of the power lift arm 52, as from the position shown in Figure 2 to the position shown in Figure 3, serves to lower the gauge wheel 25 relative to the plow beam 21, so as to move the plow bottom 23 into a shallow plowing position, it will be seen that the continued upward movement of the power lift arm 52 to raise the implement into its transport position does not continue to move the gauge wheel 25 downwardly relative to the tool beam 21 as occurred during the initial movement of the arm 52. This result is secured in the following manner: In the deep plowing position (Figure 2) the arm 51 is disposed at an angle of something more than 90 degrees relative to the link 54, and the latter in turn is disposed at an angle somewhat less than 90 degrees relative to the bell crank arm 56. However, after the first range of movement of the power lift rock shaft 11 carries the trunnion member 67 up against the nuts 70 and swings the arm 51 into a position moving the gauge wheel 25 to its shallow plowing position, the arm 51 approaches a straight line position relative to the link 54, and as will be readily understood, this is a position in which further angular movement of the arm 51 relative to the link 54 occasions only a small amount of movement of the bell crank 55, since the link 54 will not be shifted longitudinally except through a small amount. Further, in this position of the parts the toggle arms or links 35 and 36 also approach their straight line position, so that whatever small amount of movement of the bell crank 55 is occasioned by the movement of the power lift rock shaft 11 from the position shown in Figure 3 to the position shown in Figure 4 has only an insignificant or negligible effect upon the position of the gauge wheel 25 relative to the plow beam 21. By comparing Figures 3 and 4, it will be seen that the gauge wheel 25 moves only slightly relative to the plow beam 21 while the latter has been lifted from its shallow plowing position (Figure 3) into its completely raised position (Figure 4).

It will be understood, of course, that the angular relations described above are merely examplary and that various changes may be made therein as required by the operating characteristics of the implement in which the adjusting and lifting connections are incorporated. The important feature is, as will be apparent, the arrangement of the parts whereby through the action of a single member, such as the power lift rock shaft 11, the first range of movement thereof effects an adjustment of the gauging means, thereby moving a gauge wheel or the like relative to the tool beam 21, and that a subsequent range of movement of said member serves to lift both the tool means and the gauging means out of ground engaging position and into a transport position (Figure 4). Further, it will be seen that in its range of movement, the lower arm 57 of the bell crank 55 swings from a position slightly to the rear of the pivot connection between the link 26 and the tractor (Figure 2) to a position slightly forward thereof (Figure 3) during the movement of the parts in the depth adjusting range, and further, that the point of pivotal connection between the forward end of the link 60 and the lower end 57a of the bell crank arm 57 swings substantially through the pivot axis of the link 26. By virtue of this construction, the pivot points of the links 26 and 60 are so near together that swinging movement of the plow beam 21 about its hitch 22 at the forward end of the tractor in accommodating inequalities in the ground traversed will have substantially no effect upon the relation between the gauge wheel 25 and the plow beam 21, which relation is determined by parts carried, not on the plow beam itself but upon the tractor. This is an important feature of the present invention, namely, gauging the depth of operation by means on the tractor but permitting the gauging means and the earth working tool to have relatively free movement relative to the tractor. As will be readily understood, by moving the lever 81 rearwardly, the power lift rock shaft 11 may be rocked from the position shown in Figure 4 to first lower the plow into operating position and then to cause the arm 51 to exert a pull on the link 54 and hence swing the bell crank 55 in a clockwise direction (Figures 3 and 4), thus permitting the plow bottom 23 to lower relative to the gauge wheel 25 to the desired operating depth. When the plow bottom 23 reaches the desired depth the valve lever 81 may be returned to neutral position, which locks the power lift and gauging connections in that position.

Ordinarily, the farmer desires to maintain a substantially constant depth of plowing throughout the whole field, even though it is necessary to raise the plow to transport position (Figure 4) when turning around at the ends of the field. If necessary, the farmer can always return the plow bottom 23 to lowered position at exactly the depth desired by watching the plow and at the proper moment returning the valve lever 81 to its neutral position. However, according to the principles of the present invention, I provide means associated with the power lift mechanism and the controlling valve lever 81 therefor, so constructed and arranged that the mechanism may be so adjusted as to return automatically to the same depth without requiring any attention on the part of the operator other than first making the desired depth setting and then initiating the lowering of the implement, the mechanism then subsequently returning the valve means automatically to its locked position when the plow bottom 23 and/or gauge wheel 25 occupy the desired relative position to secure the proper depth of operation as determined by the depth setting.

Referring again to Figure 1, the valve adjusting lever 81 carries an extension 91 having serrations or ridges 92 over which the upper end of a lever 93 may be moved. The lever 93 is pivoted at 94 on the lever 81 and carries a pin 96 on which the slotted end, as at 97, of the link 98 is received. The other end of the link 98, as shown at 99, is pivotally connected to the third arm of the power lift bell crank 50. The lever 93 serves as a depth setting member and carries a hand grip or handle 101.

The function of the link 98 and associated parts is to act through the lever 93 to automatically return the valve actuating lever from its lowered position (dotted lines Figure 5) to its neutral position (Figures 2 and 3). This action is effected in the following manner.

Figure 5:
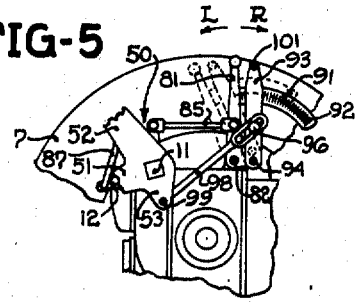
Figure 5 is a fragmentary side view, showing the position of the depth controlling levers for shallow plowing but with the unit in its raised or transport position.

When the implement is raised, as shown in Figure 4, the position of the link 98 and associated parts is shown in Figure 5. It will be noted that the pin 96 occupies a position adjacent the upper and outer end of the slot 97. Also, in Figure 5, the lever 93 occupies a position close to the lever 81, which corresponds to the adjustment of the parts for shallow plowing, as shown in Figure 3. Assuming that the farmer desires to return the implement from its raised position (Figures 4 and 5) to its lowered position (Figure 3) he manually moves the valve lever 81 from its full line position in Figure 5 to its dotted line position, the depth setting lever 93 moving bodily with the lever 81 as permitted by the slot 97 accommodating the downward and rearward movement of the pin 96 therein. The rear movement of the lever 81 actuates the power lift valve means so as to cause the rock shaft 11 to be rocked in a counter-clockwise direction (Figures 4 and 5), and the downward swinging movement of the arm 52 in consequence thereof lowers the plow, and at the same time the downward and forward swinging movement of the power lift arm 51 acts through the link 54 to position the gauge wheel 25 for shallow plowing (Figure 3). Further, and also at the same time, the forward and upward swinging movement of the arm 53 shifts the link 98 forwardly until the inner end of the slot 97 engages the pin 96. Further continued downward movement of the power lift shaft 11 and the power lift bell crank 50 then exerts a thrust through the link 98 against the pin 96 until the lever 81 is automatically moved back into its neutral position (full lines, Figure 5), thereby locking the parts for plowing at the operating depth as determined by the position of the lever 93 on the lever 81. If, instead of being adjacent the hand lever 81, the depth setting lever 93 is disposed in adjusted position, such as indicated in Figure 2 for deep plowing, it will be apparent that when returning the plow to operating position, the link 98 will be required to move forwardly an additional amount before engaging the pin 96 and automatically returning the lever 81 to its neutral position. Hence, when the lever 93 is in the position shown in Figure 2, the power lift mechanism continues to lower the arm 52 past the position shown in Figure 3, which action shifts the gauge wheel links 35 and 36 to the position shown in Figure 2 before the lever 81 is automatically returned to its locked position. Therefore, according to the principles of the present invention, the operating position of the implement is automatically controlled by the setting of the lever 93. Preferably, the slot 97 is of sufficient length that the power lift bell crank 50 can move into its raised position (Figure 5) while the arm 81, controlling the power lift valve mechanism, remains in its forward position (dotted lines, Figure 3), regardless of the depth setting of the lever 93 on the sector 91. This is for the purpose of preventing the movement of the power lift mechanism to raised position affecting the valve operating lever 81, since it is preferable to have the plow raised to the same position, regardless of the depth setting of the lever 93. As disclosed in my prior patent, identified above, the power lift mechanism will automatically stop in its fully raised position, independently of the position of the valve controlling lever 81. However, if it is desired to automatically control the implement by moving the valve lever 81 automatically to a position when the bell crank 50 reaches its completely raised position (Figure 5), a second link, similar to the link 98, may be pivoted at 99 or some other part and slotted to receive a pin, similar to the pin 96 on the lever 93, mounted on the lever 81 whereby, regardless of the setting of the lever 93, the lever 81 will automatically be moved into neutral position when the bell crank member 50 on the power lift rock shaft 11 reaches its fully raised position as shown in Figure 5.

Figure 6:
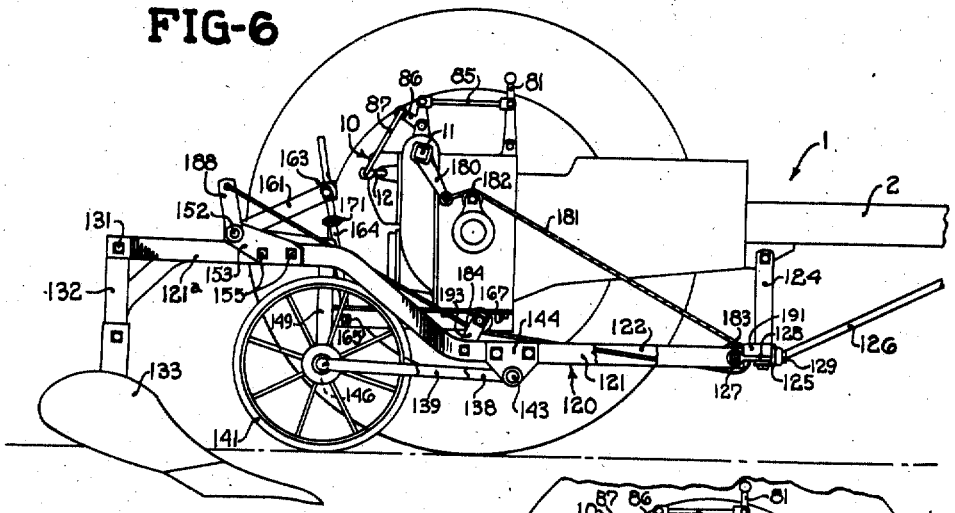
Figure 6 illustrates the application of the principles of the present invention to a single bottom lister mounted on a tractor having a power lift of the hydraulic double acting locking type arranged to control the depth of operation and to raise the lister bottom and the gauging means simultaneously into transport position.
Figure 7:
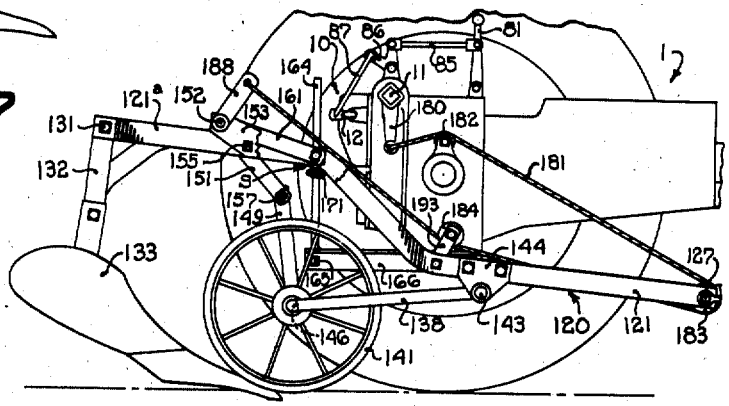
Figure 7 is a view similar to Figure 6, showing the parts in the positions they occupy when the lister is in a shallow plowing position.
Figure 8:
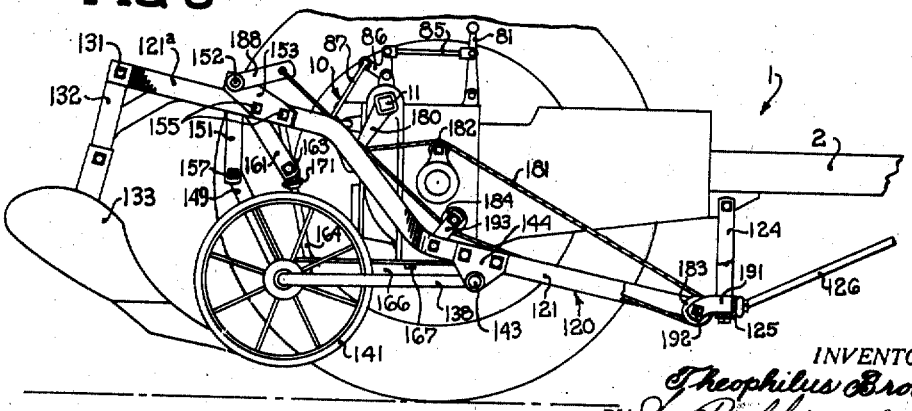
Figure 8 shows the parts in the positions they occupy when the unit is raised into transport position.

The present invention is not necessarily limited to an implement of the type shown in Figures 1–4 nor to the particular linkages disclosed by way of illustration in said figures. Referring now more particularly to Figures 6, 7 and 8, I have shown the present invention as applied to a single bottom tractor mounted lister. A lister of this general type is disclosed and claimed in the co-pending application of Walter H. Silver, Serial No. 296,925, filed Sept. 28, 1939. In Figures 6–8, the lister frame is indicated by the reference numeral 120 and consists of a pair of frame bars 121 and 122 extending generally longitudinally of the tractor 1 to which it is attached by means of a pair of vertically depending bars 124 pivoted at their upper ends to the tractor frame bars 3 and secured at their lower ends to a transverse draft member in the form of an angle bar 125. Draft rods 126 extend forwardly from the cross bar 125 to the front portion of the tractor, and the frame bars 121 and 122 are pivoted by means of pivot bolts 127 to brackets 128 which are bolted, as at 129, to opposite ends of the cross bar 125. The pivot bolts 127 define a transverse pivot axis about which the tool bar or beam structure 120 may swing generally vertically relative to the tractor 1.

The rear ends of the frame bars 121 and 122 converge rearwardly, as indicated at 121a and are bolted at 131 to the upper end of a lister bottom standard 132. A lister bottom 133 is secured to the lower end of the standard 132.

The gauging means for the implement shown in Figures 6–8 comprises a pair of crank axles 138 and 139 pivotally connected to the associated frame bars 121 and 122, respectively, and carrying gauge wheels 141 at their rear ends. Each of the crank axles 138 and 139 includes a laterally outwardly bent end 143 which is received for rocking movement in a bracket 144 secured, as by bolts or the like, to the associated frame bar, and similarly, each of the crank axles also includes a laterally inwardly bent end 146 on which the associated gauge wheel 141 is journaled.

The gauge wheels 141, as best shown in the co-pending application, identified above, are disposed laterally of one another, each crank axle being connected by a link 149 to an arm 151 fixed to a rock shaft 152 which is supported for rocking movement in a pair of brackets 153, secured, as by bolts 155, to each of the frame bars 121 and 122 adjacent the rear ends of the converging portions thereof. The pivot connection between the two arms or links 149 and 151 is indicated in Figures 7 and 8 by the reference numeral 157. A second arm 161 is fixed to the rock shaft 152 and at its outer end is pivoted to trunnions on a sleeve member 163 that is slidable on the upper end of a strut 164. The lower end of the latter is pivotally connected, as at 165, to a pair of angle brackets 166 which are bolted, as at 167, to the under side of the tractor rear axle housing. A stop 171 is fixed to or formed on the strut 164 in a position to be engaged by the slidable member 163 to enable the tool beam to be raised, as will be explained below. The arms 151 and 161 constitute, in effect, a bell crank of which the arms are sections connected, respectively, with the gauge wheel 141 and the strut 164.

In this form of the invention, the power lift mechanism 10 is, as in the form described above, so connected with the gauge wheel structure that vertical swinging movement of the tool beam relative to the tractor, as the gauge wheel follows variations in the ground surface, will not affect the gauging and lifting connections to any material extent. In Figures 1–5, the disposition of the forward pivot of the link 60 at the lower end 57*a* of the arm 57 closely adjacent the axis of the section 27 of the link 26, and further the disposition of both of these parts substantially in the horizontal plane of the plow beam 21, makes it possible for the latter to swing vertically, carrying with it the gauge wheel 25, but without having the movement of the plow beam and/or gauge wheel relative to the tractor, and the gauging and lifting connections carried thereby, introduce any variations in the position of the gauge wheel relative to the plow beam 21. In the form of the invention shown in Figures 6–8, the connections for gauging and lifting include a flexible element trained about a sheave that rotates about an axis coincident with the axis of the pivot bolts 127. Hence, the frame structure 120 is enabled to swing vertically, carrying with it the gauge wheels 141, but the gauging and lifting connections extending between the gauge wheel structure and the tractor do not cause the positions of the gauge wheels 141 relative to the frame structure to vary.

In this form of the present invention an arm 180 is fixed to one end of the power lift rock shaft 11 and is connected by means of a flexible cable 181, which is trained over a pulley 182 on the rear axle, a sheave 183 carried by the cross bar 125 and an idler sheave 184 on the frame bar 122, to an arm 188 fixed to one end of the rock shaft 152 carried on the lister beam for rocking movement in the brackets 153. As best shown in Figure 8, the sheave 183, the axis of rotation of which coincides with the pivot axis for the lister beam structure as defined by the pivot bolts 127, is carried by a bracket 191 bolted or otherwise fixed to the cross bar 125. Preferably, the sheave 183 is mounted for rotation on the bracket 191 by a pivot bolt 192. The idler sheave 184 is supported for rotation by a bracket 193 fixed in any suitable manner to the beam structure 120. Since the sheave 183 is mounted for rotation about the pivot axis of the lister beam or frame structure 120, it will be seen that rising and falling movements of the lister will not introduce any variations in the position of the gauge wheels relative to the lister frame.

The operation of the construction shown in Figures 6–8 is substantially the same as that described above in connection with Figures 1–5. In Figures 6–8, when the valve lever 81 is moved forwardly the rock shaft 11 is rocked in a direction to raise the implement, namely, in a clockwise direction as viewed in Figure 6. This exerts a pull through the cable 181 and acts to rock the arm 188, also in a clockwise direction. This acts through the toggle arm or link 151 and exerts a downward thrust on the links 149 and the associated gauge wheels 141, thereby raising the lister bottom 133 substantially to the position shown in Figure 7, which is the shallowest working position. The relation of the links 151 and 149 is such that at this point the shiftable sleeve member 163 is spaced as at S, from the stop flange 171. If the valve lever 81 is held in its forward or raised position, the power lift shaft 11 continues to rock in a clockwise direction and the pull exerted thereby through the cable 181 against the arm 188 causes the outer end of the arm 161 to move the member 163 into engagement with the stop 171 and react through the strut 164 and brackets 166 against the tractor to raise the lister beam structure 120 from the position shown in Figure 7 to the position shown in Figure 8. However, it will be noted from Figure 7 that the toggle arms or links 149 and 151 are nearly in their straight line position, and hence the angular movement of the member 153, 188 necessary to raise the tool beam to the transport position shown in Figure 8 does not cause the gauge wheels 141 to move very much farther relative to the tool beam. In fact, the toggle links 149 and 151 serve to hold the gauge wheels 141 in a position slightly below the lister bottom 133 when the gauge wheels and the lister bottom are raised into their transport position, as shown in Figure 8. The wheels 141 thus are in a position to prevent the plow bottom point from digging into the ground if the tractor wheels should pass down into a depression. In this case the wheels 141 would engage the ground and momentarily lift the whole implement, as permitted by the slidable member 163. If desired the links 35, 36 and 56, 57 of Figures 1–5 may be arranged to provide this same protection for the plow bottom 23 when raised.

When the tool beam reaches the position shown in Figure 8, the valve lever 81 is returned to its intermediate or locked position. Thus, according to the present invention I provide suitable connections between the power lift arm 180 and the gauging and lifting arm 188 on the implement so that the first range of movement of the member 180 acts to shift the gauge wheels to various operating positions relative to the lister bottom 133 through connections which are not affected by rising and falling movement of the lister beam during travel over uneven ground, and movement of the member 180 through another range of movement serves to raise both the gauge means and the tool means relative to the tractor while preventing the gauge wheels from moving any material extent relative to the tool beam being raised. The lister is lowered from its transport position into an operating position by moving the valve lever 81 rearwardly, as in the modification shown in Figures 1–5 and described above, and when the lister reaches the desired operating depth, the valve lever 81 is returned to its intermediate or locked position which holds the gauge wheels and associated parts in their adjusted operating position. If desired, the automatically operating means for returning the valve lever 81 to intermediate position when the plow reaches a predetermined depth, such as is shown in Figures 1–5 and described above, may be employed in the construction illustrated in Figures 6–8. However, for purposes of clarity, such automatic means for returning the lister to a predetermined operating position has been omitted from Figures 6–8.

Both of the agricultural implements described above have been in the nature of integral plows carried by the tractor at the rear thereof. However, the principles of the present invention are equally applicable to implements carried at the front of the tractor, such as, for example, cultivators having gauge wheels or other means for gauging the operating depth of the cultivating tool or tools and adapted to be raised into inoperative or transport position.

Referring now more particularly to Figures 9–12, inclusive, the tractor 1 is shown as provided with one or more cultivator units, indicated by the reference numeral 200, supported by one or more transverse draft beams 201. The latter extends outwardly from the forward portion of the tractor at each side thereof according to the usual arrangement of tools of this character. Rigidly secured to the draft beam 201 is one or more supporting members 203, depending upon the number of rigs 200 employed. Each supporting member 203 includes an upper section 204 in which a rock shaft 205 is carried and the lower section 206 in which the pivot 207 of a connecting link member 208 is received. An upper link 212 is disposed in substantial parallelism with the lower link 208 and is provided at its upper end with a screw threaded portion received in a socket 213 which is pivotally mounted on the rock shaft 205. The lower end of the link 212 is turned outwardly, as at 216, and is pivotally disposed in the upper end of a bracket 217 forming a part of a shovel supporting member 218, the lower end of which is provided with aperture legs 219 in which the lower end of the lower link 208 is disposed and connected thereto by a pivot pin 220 or other suitable means. A shovel unit 221 is adjustably secured to the member 218 by means of a bracket 222.

Figure 12:
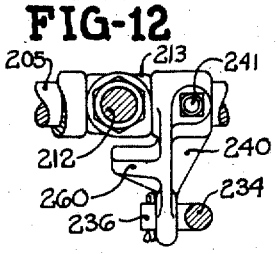
Figure 12 is a fragmentary section taken on the line 12—12 of Figure 9.

Also pivotally mounted on the end 216 of the upper link 212 is an L-shaped bracket 227 carrying a sleeve 228 at its forward end in which the spindle 229 of a castering gauge wheel 230 is disposed, and the position of the gauge wheel 230 relative to the tool 221 is controlled by means of a link 234 which is pivoted at its lower end 235 to the arm or bracket 227 and at its upper end, as best shown in Figure 12, is bent laterally, as at 236, and pivotally received in a depth adjusting arm 240. The latter is fixed by a set screw or the like, as indicated at 241 in Figure 12, to the pivot shaft or rock shaft 205.

A cultivator rig of this general construction is disclosed and claimed in the Patent No. 1,962,-349, issued June 12, 1934, to Theodore W. Johnson, to which reference may be had if desired. As disclosed in said patent, the links 208, 212 and 234 are arranged in parallelism so that the tool 221 and its gauge wheel 230 may rise and fall relative to the tractor so as to follow freely any variations in the ground surface. Further, rocking of the arm or arms 240 will act through the associated link 234 to change the position of the guage wheel 230 relative to the tool 221. As more clearly shown in said patent, the pivot or rock shaft 205 carries as many arms 240 as there are cultivator rigs 200 at that side of the tractor.

According to the principles of the present invention, I provide means whereby the power lift mechanism 10 of the tractor may be utilized, both for changing the depth adjustment of the gauge wheel or wheels 230 and for raising the cultivator rig or rigs into transport position out of engagement with the ground. To this end, an arm 250 is suitably fixed at its lower end to the rock shaft 205 and at its upper end carries a member 251 fixed, as by collars 252 and 252a, to the forward end of a power lift link 253. The rear end of the latter is pivoted, as at 254, to an operating arm 255 fixed to the rock shaft 11 of the power lift mechanism 10. Where there are cultivator rigs at opposite sides of the tractor 1, each end of the rock shaft 11 may carry an arm 255 connected to the rod 253 to the associated rock shaft arm 250. According to the present invention, each of the adjusting arms 240 is formed with a lug 260 which, as best shown in Figure 12, extends laterally underneath the associated sleeve 213 to which the forward end of the link 212 is connected.

Figure 9:
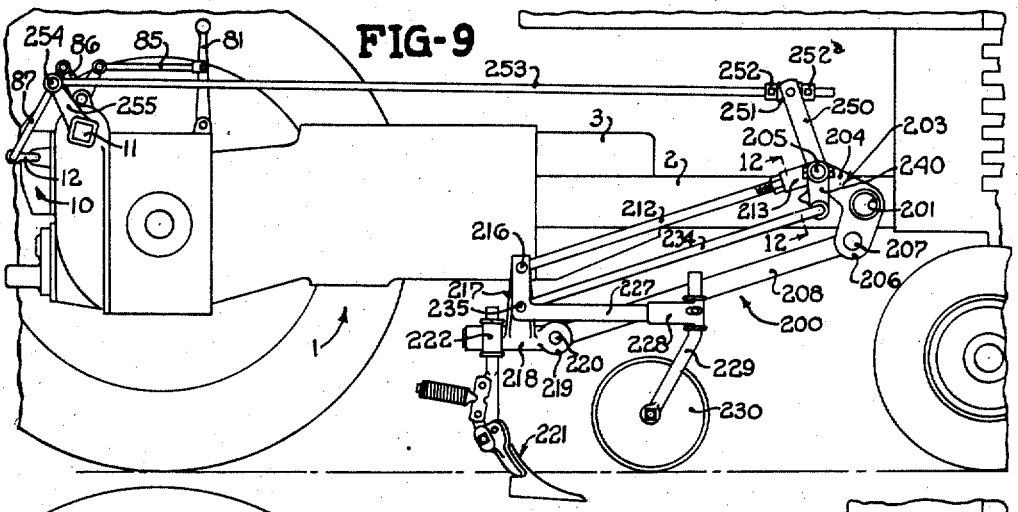
Figure 9 is a side view of a cultivating implement in which the principles of the present invention have been incorporated.
Figure 10:
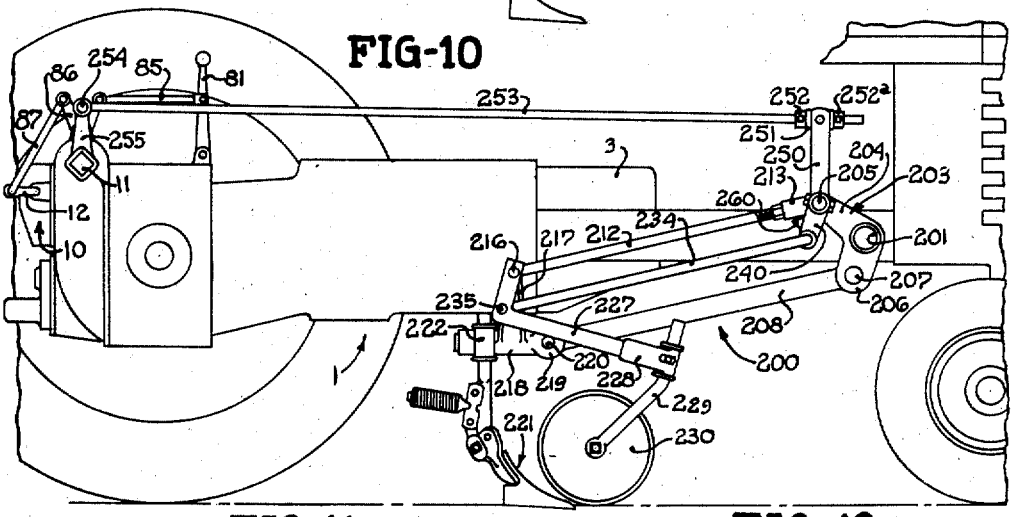
Figure 10 is a view of the implement shown in Figure 9, with the tools disposed in their shallow working position and with the power lift unit in a position to start raising both the tool means and the gauge wheel relative to the tractor.
Figure 11:
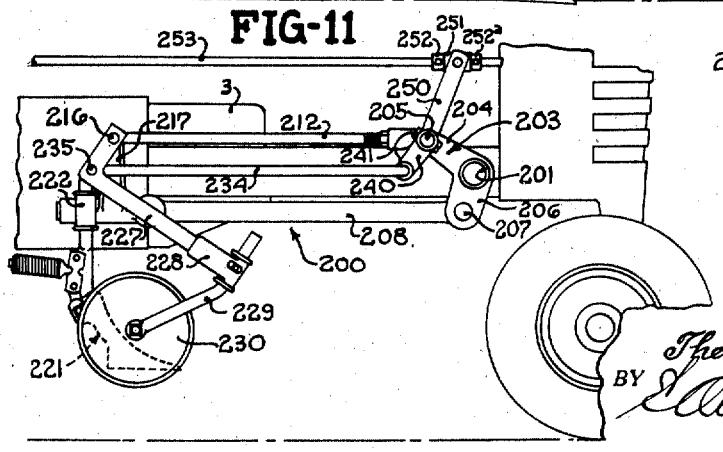
Figure 11 shows the tool means and gauge wheel in their raised or transport position.

The operation of the implement shown in Figures 9–12 is similar to the implements described above. The power lift mechanism 10 is controlled by the hand lever 81 in the manner described above. When the hand lever 81 is moved out of its neutral position into a forward position, the power lift arm 255 is rocked in a clockwise direction (Figure 9), which exerts a thrust through the rod 253 on the arm 250. This rocks the pivot shaft 205 in a clockwise direction, which exerts a rearward thrust through the link 234 against the gauge wheel bracket 227, raising the tool 221 relative thereto. Figure 9 shows the latter in a relatively deep plowing position, and Figure 10 shows the relative positions of the parts when the power lift mechanism 10 has been actuated to act through the arms 250 and 240 to raise the tools to shallowest position, at which point the lug or lugs 260 are in a position ready to engage the sleeves 213 of the links 212. After this occurs, a further forward movement of the rod 253 acts through the arm 250 and pivot shaft 205 to raise the cultivator rig or rigs into their lifted position, as shown in Figure 11. It will be seen, therefore, that the arm or arms 240 have two ranges of movement; first, in moving from the position shown in Figure 9 to the position shown in Figure 10, the arm or arms 240 determine the position of the gauge wheel or wheels 230 relative to the tools, and second, when the arm or arms 240 move from the position shown in Figure 10 to the position shown in Figure 11, both the tools and the gauge wheel or wheels are raised together out of ground engaging position. Preferably, the gauge wheels 230 are disposed to one side of the path of movement of the associated tool 221, so that when the rig is raised, each gauge wheel may be disposed in a position alongside the associated tool. Like the form of the invention shown in Figures 6–8, the automatic valve controlling means shown in Figures 1–5 may, if desired, be employed in the construction just described for adjusting the depth of operation and automatically returning the tool or tools to the selected working position. It will also be apparent that the means I have provided for gauging the depth of operation of tools, freely movable relative to the tractor, from the power lift mechanism of the tractor may be utilized with tools both at the front and rear of the tractor, as by combining the mechanisms shown in either of the first described two modifications with the mechanism shown in the last described modification, or their equivalents. In all of the modifications shown and described above, it will be observed that the tractor carrying the double acting hydraulic power lift mechanism of the locking type also serves as the implement or supporting frame for the tool means and that, generally speaking, the power lift shaft, or the arm or arms connected therewith, forms a part which is operatively connected with the gauging means for first adjusting the same relative to the associated tool means and then raising both the tool means and the gauging means relative to the tractor. So far as I am aware, this is broadly new.

While I have shown and described above the preferred means in which the principles of the present invention have been incorporated, it will be apparent to those skilled in the art that my invention is not to be limited to the particular means shown and described above, but that, in fact, widely different means may be employed in the practice of the broader aspects of my invention.

What I claim, therefore, and desire to secure by Letters Patent is:

1. An agricultural machine comprising a tractor having a power connection, tool means connected with the tractor, means for gauging the depth of operation thereof, means for lifting said tool means, and means deriving power from the tractor power connection for actuating said gauging means and said lifting means in succession.

2. An agricultural machine comprising a tractor having a power connection, tool means connected with the tractor for movement relative thereto, gauging means normally movable with said tool means relative to the tractor, means for lifting both the gauging means and the tool means, and means deriving power from the tractor power connection for actuating said gauging means and said lifting means in succession.

3. An agricultural machine comprising means serving as an implement frame, tool means movably connected therewith, gauging means connected with said frame means for movement relative thereto about an axis, adjustable connections between said tool means and said gauging means and operative to cause the latter to move with said tool means relative to said frame means when the tool means is moved, a member for operating said adjustable connections and extending to a point adjacent said axis, and means on the frame means pivotally connected with said member at a point closely adjacent said axis for adjusting said connections and determining the position of said tool means relative to said gauging means while accommodating movement of the latter with the tool means.

4. The combination with a tractor, of tool means movably connected therewith, gauge means normally movable with said tool means for gauging the operation thereof, means for shifting the position of said gauge means relative to said tool means, and a member on the tractor connected with both said tool means and said gauge means and operative sequentially to actuate said gauge means and then raise said tool means.

5. An agricultural implement comprising an implement frame, a plow beam movably connected therewith, a gauging means movably connected with said plow beam, a link connecting said gauging means with said frame, means operative through one range for shifting said link for varying the position of the gauging means relative to said beam, and connections whereby said means is operative through another range to raise said plow beam into its transport position.

6. An agricultural implement comprising means serving as a supporting frame, tool means movably connected therewith, gauge means including a ground engaging element and means connecting the latter with said tool means, a pair of links connected with said gauge means, means connecting one of said links with said frame, and means for shifting the other of said links for varying the position of the gauge means relative to said tool means.

7. The combination with a tractor, of tool means movably connected therewith, gauge means normally movable with said tool means but capable of being shifted relative to said tool means for gauging the operation thereof, means on the tractor for first shifting the position of said gauge means relative to said tool means and then raising both said gauge and tool means together, and means associated therewith for limiting the lowered position of said tool means.

8. The combination with a tractor, of ground engaging tool means connected to receive draft therefrom and to move generally vertically relative thereto, a gauge wheel, connecting means between said gauge wheel and said tool means and movable to gauge the depth of operation of the latter, power lift mechanism for actuating said connecting means, and a lost motion connection actuated by said power lift mechanism and first accommodating movement of said movable member when shifting said gauge wheel relative to said tool means and then acting to raise both said tool means and said gauge wheel relative to the tractor after the lost motion has been taken up.

9. The combination with a tractor, of ground engaging tool means connected therewith to receive draft therefrom and to move generally vertically relative thereto, a gauge wheel normally movable with said tool means but capable of being shifted relative to said tool means for gauging the depth of operation thereof, a member having a lost motion connection with said tool means, and a part movable to position said gauge wheel relative to said tool means to adjust the depth of penetration of the latter and simultaneously move said member to take up said lost motion, further movement of said part acting through said member to raise said tool means and said gauge wheel.

10. The combination with a tractor having a power lift, of ground engaging tool means connected therewith to receive draft therefrom and to move generally vertically relative thereto, a gauge wheel, movable connections between said gauge wheel and said tool means and movable to gauge the depth of operation of the latter, a member driven by the tractor power lift and having a lost motion connection with said tool means, and a part movable with said member and operable to position said connections while the movement of said member serves to take up said lost motion, further movement of said power lift acting through said member for raising both said gauge wheel and said tool means.

11. An agricultural implement comprising tool means adapted to be raised and lowered, gauge means for said tool means, said gauge means being movable relative to said tool means to gauge the operation thereof, a power lift operated lever, means operated by the latter through one range of movement thereof for shifting said gauge means relative to said tool means for gauging the depth of operation of the latter, and means operated by said lever through another range of movement thereof for raising both said tool means and said gauge means out of ground engaging position.

12. The combination with a tractor, of tool means movably connected with the tractor for movement relative thereto, gauge means movably connected with said tool means for gauging the operation thereof, means on the tractor and reacting thereagainst for shifting the position of the gauge means relative to the tool means to change the depth of operation thereof, and means connecting said tool means and the means on the tractor that shifts said gauge means for determining the lowered position of said tool means.

13. The combination with a tractor, of tool means movably connected with the tractor for movement relative thereto, gauge means movably connected with said tool means for gauging the operation thereof, mechanism for moving said gauge means relative to said tool means, means swingably connecting the gauge means with the tractor for movement relative thereto about an axis and accommodating movement of said gauge means with said movable tool means, and depth adjusting means on the tractor and connected with said mechanism at a point closely adjacent said axis.

14. An agricultural machine as defined in claim 12, further characterized by said tractor having a power lift including a movable member to which said connecting means connects said tool means, and means on said movable member for automatically determining the lowered position of the tool means.

15. The combination with a tractor having a power lift, of tool means movably connected with the tractor for movement relative thereto, gauge means movably connected with said tool means for gauging the operation thereof, mechanism for moving said gauge means relative to said tool means, means swingably connecting the gauge means with the tractor for movement relative thereto about an axis and accommodating movement of said gauge means with said movable tool means, a pair of interconnected parts mounted on the tractor, means connecting one of said parts with said mechanism at a point adjacent said axis, lost-motion means connecting the other part with said tool means, and means on the tractor for operating both of said parts.

16. An agricultural machine comprising a tractor having a power lift of the type in which a member may be moved to and held in various positions, tool means, gauge means movably connected with said tool means, means operated by movement of said member through one range for adjusting the position of said gauge means relative to said tool means, and means operated by movement of said member through another range for raising both the tool means and said gauge means.

17. An agricultural implement adapted to be attached to a tractor having a power lift of the type in which a member may be moved to and held in various positions, comprising tool means adapted to be movably connected with the tractor, gauge means movably connected with said tool means, means adapted to be operated by movement of said member through one range for adjusting the position of said gauge means relative to said tool means, and means adapted to be operated by movement of said member through another range for raising both the tool means and said gauge means.

18. An agricultural machine comprising a tractor having a power lift of the type in which a member may be moved to and held in various positions, tool means movably connected with the tractor, gauge means movably connected with said tool means and operative to determine the depth of penetration thereof, means operated by movement of said member through one range for adjusting the position of said gauge means relative to said tool means, means operative by movement of said member in one direction through another range for raising both the tool means and said gauge means, movement of said member in the other direction serving to lower said tool and gauge means until the gauge means engages the ground, and means controlled by movement of said member in said other direction for limiting the movement of said gauge means relative to the tool means when the latter is lowered into its operating position.

19. A machine as defined in claim 18, further characterized by the provision of a lever for controlling the operation of said power lift member, a part adjustably fixed to said lever, and connections between said member and said part, whereby said lever is moved into a position locking said power lift member against further movement after it has been moved in said other direction a predetermined amount.

20. In an agricultural implement adapted to be connected to a tractor having a power lift, the combination of a generally longitudinally extending vertically swingable tool beam carrying ground engaging tool means, a gauge wheel adapted to traverse the surface of the ground for gauging the depth of operation of said tool means, a pair of links operatively connecting said gauge wheel with said tool beam, one of said links being pivoted to the latter and pivotal motion thereof acting through the other link to position the gauge wheel relative to said tool means, means actuated by said power lift, lost motion means connecting said power lift actuated means with said tool beam, and means extending between said power lift actuated means and said pair of links for shifting the latter to move said gauge wheel relative to said tool beam, said power lift actuated means first serving to take up the lost motion in said lost motion means, further movement of said power lift means acting through said lost motion means for raising said tool beam relative to the tractor, said links being disposed at such an angle relative to one another after the power lift actuated means takes up said lost motion that the movement of said shifting means when raising the tool means occasions only a small amount of movement of the gauge wheel relative to the tool beam.

21. An agricultural implement comprising the combination with a tractor having a power lift including a part adapted to be moved to and held against movement in various positions, ground engaging tool means adapted to be raised and lowered relative to the tractor, a gauge wheel pivotally connected with the tractor for vertical swinging movement, means serving as a toggle linkage operatively connecting said gauge wheel and tool means whereby movement of said toggle linkage operates to shift the position of said gauge wheel relative to said tool means, a bell crank pivoted to the tractor and having one arm link connected with said toggle linkage, means serving as a second toggle linkage operatively connecting said power lift part with the other arm of said bell crank, said mentioned toggle linkage being arranged so that it moves into a generally straight line position at the same time the corresponding movement of said bell crank causes said first toggle linkage to move into its generally straight line position, and operative connections between said power lift part and said tool means for raising the latter into its inoperative position, said toggle linkages being in generally straight line positions serving to prevent said gauge wheel from moving relative to said tool means, whereby raising movement of the latter also raises the gauge wheel out of engagement with the ground.

22. In a tractor having a hydraulic power lift mechanism including a rock shaft and a valve controlling lever arranged to be shifted in one direction or the other to cause said rock shaft to be rocked in one direction or the other and arranged to be shifted into a neutral position causing said rock shaft to be locked against movement in either direction, the combination of tool means adapted to be connected with the tractor for generally vertical movement relative thereto, means actuated by said rock shaft and operatively connected with said tool means for raising and lowering the latter, and means movable concomitantly with said tool means and operatively connected with said lever for automatically moving the latter into a neutral position when said tool means reaches its lowered position.

23. The combination set forth in claim 22, further characterized by a part adjustably connected with said lever and operatively associated with said concomitantly movable means for adjusting the position of said tool means when said valve controlling lever is moved into its neutral position.

24. The combination set forth in claim 22, further characterized by the provision of connections between said rock shaft and said lever including a link having a slot therein and operatively connected with said rock shaft, and a part on said lever having a projection received by the slot in said lever, whereby the latter is connected with said rock shaft through a lost motion connection, movement of said lever in a direction to carry said projection from one end of the slot toward the other serving to cause said rock shaft to be rocked in a direction to raise said tool means and movement of the lever in the other direction serving to cause said rock shaft to be rocked in a direction to lower said tool means, said one end of said slot being engageable with said projection to move said lever back into a neutral position, thereby terminating further movement of said power lift rock shaft when said tool means has reached the desired lowered position.

25. An agricultural machine comprising an implement frame, a cultivator rig movably connected therewith, a gauging means movably connected with said rig, and power lift means operatively connected with said rig and gauging means and adapted through a first range of movement to shift said gauging means relative to said cultivator rig to determine the depth of operation thereof and through another range of movement for raising both said cultivator rig and said gauging means out of ground engaging position.

26. In an agricultural implement, a tool bar, a member pivoted thereto, a gauge wheel carried by said member and operative to determine the working position of said tool bar, and means operative through one range of movement for swinging said member relative to said tool bar to vary the working position of the latter and having a part engageable with said bar for swinging the latter and said gauge wheel into transport position.

27. In an agricultural implement, means serving as an implement frame, tool means movably connected therewith, gauge means also movably connected with said frame means and operative to swing relative thereto about a pivot axis, and means for adjusting the position of said gauge means relative to said tool means, including a part carried by said frame means and movable adjacent said pivot axis, whereby the position of the gauge means relative to the tool means is substantially unaffected by variations in the position of the tool means relative to the implement frame.

28. The combination set forth in claim 27, further characterized by means operative after said part has moved through an adjusting range for raising both said tool means and said gauge means relative to the implement frame means.

29. In an agricultural implement, means serving as an implement frame, tool means, means pivotally connecting said tool means with said frame means, gauge means, means pivotally connecting the latter with said frame means, means adjustably connecting said gauge means with said tool means, and means extending adjacent said last mentioned pivot connection and acting through said adjustable means to shift said gauge means relative to said tool means for determining the depth of operation of the latter irrespective of movement of said tool means relative to said implement means about its pivot connection therewith.

30. The combination with a cultivator having an implement frame, a cultivator rig movably connected therewith, and gauging means movably connected with said rig, of means operative through a given range of movement for adjusting the position of said gauging means relative to said rig, said last mentioned means including a part engageable with the rig upon further movement for raising both said rig and said gauging means relative to said frame.

31. An agricultural machine comprising a tractor, tool means connected with the tractor for movement relative thereto, means serving as a bell crank mounted for rocking movement on the tractor, means connected with one arm of said bell crank means for gauging the operating position of said tool means, and means connected with the other arm of said bell crank means for moving said tool means into an inoperative position.

32. An agricultural machine as defined in claim 31, further characterized by said last mentioned means including lost motion means to accommodate movement of the tool means relative to said other arm of the bell crank means incident to movement of the tool means by the gauging action of said one bell crank arm.

33. An agricultural machine as defined in claim 31, further characterized by hydraulic means driven from the tractor for rocking said bell crank means.

34. An agricultural machine as defined in claim 31, further characterized by hydraulic means driven from the tractor for rocking said bell crank means, and means for controlling said hydraulic means from the position of said bell crank means.

35. An agricultural machine as defined in claim 31, further characterized by said first mentioned connecting means including connections whereby when said second bell crank arm moves said tool means into an inoperative position said first bell crank arm limits the movement of said gauging means relative to said tool means.

36. An agricultural machine comprising a tractor, tool means connected with the tractor for movement relative thereto, means serving as a bell crank mounted for rocking movement on the tool means, means connected with one arm of said bell crank means for gauging the operating position of said tool means, means connected with the other arm of said bell crank means for moving said tool means into an inoperative position, and means on the tractor for rocking said bell crank means.

37. An agricultural machine comprising a tractor, tool means connected with the tractor for movement relative thereto, a part mounted on the tractor for rocking movement and having two sections, a ground engaging gauge wheel, means swingably connecting the gauge wheel with said tool means, means operatively connecting one of said sections with said swingable means for positioning said gauge wheel relative to said tool means, and means whereby the other section moves said tool means into inoperative position.

38. An agricultural machine comprising an implement frame, a cultivator rig movably connected therewith, a gauging means movably connected with said rig, a rockably mounted member having two sections, means operatively connecting one of said sections with said gauging means for determining the depth of operation of said rig, and means whereby movement of said other section raises said rig into its inoperative position.

39. An agricultural machine comprising a tractor, a tool beam connected therewith for generally vertical swinging movement, a part movably connected with said tool beam, means mounted for rocking movement on the tractor and having two sections, means connecting one of said sections with said part for positioning the latter relative to said tool beam, and means whereby the other section raises both said tool means and said part into inoperative position, said one section and its connection with said part serving to limit the movement of the latter relative to said tool means when the tool means is raised by said other section.

40. The combination set forth in claim 22, further characterized by the provision of a pair of stops associated with said movable means and said lever, respectively, and interengageable during movement of said tool means for returning said control lever to said neutral position to stop said tool means, and means carried by said control lever for adjusting the position of one of said stops to advance or retard the terminal position of said tool means.

41. The combination set forth in claim 22, further characterized by the provision of a handle mounted on said lever and optionally movable relative thereto, stop means to said movable means, and cooperative stop means connected to said handle and shiftable relative to said first mentioned stop means by moving said handle relative to said lever, thereby changing the terminal position of said tool means.

42. In a device of the class described, the combination of a power actuated movable member, a control lever associated therewith and shiftable from a neutral position to effect a movement of said member in a certain direction, a pair of stops attached to said movable member and said control lever, respectively, and interengageable during movement of said member for returning said control lever to said neutral position to stop said member, and means carried by said control lever for adjusting the position of one of said stops to advance or retard the terminal position of said movable member.

43. In a hydraulic mechanism, the combination of a pair of cooperative hydraulic cylinder and piston members movable relative to each other, a control lever associated therewith and shiftable from a neutral position to effect a relative movement of said cylinder and piston, stop means movable with one of said members relative to said control lever to engage stop means carried by the latter and return said lever to said neutral position to stop said members at a certain terminal position, and means carried by said lever for adjusting the positions of the interengaging stop means relative to said lever and said cooperative hydraulic members to adjustably determine the terminal position of the latter.

44. In a device of the class described, the combination of a power actuated movable member, a control element associated therewith and shiftable from a neutral position to effect a movement of said member in a certain direction, a pair of interengageable stops, one of said stops being associated with said control element and engageable with the other of said stops to limit the extent of movement of said member, a manually operable lever connected with said control element, and an adjusting device mounted on said lever for adjusting the position of one of said stops, thereby changing the terminal position of said member.

45. In a device of the class described, the combination of a power actuated movable member, a manually operable control lever associated therewith and shiftable from a neutral position to effect a movement of said member in a certain direction, a pair of interengageable stops, one of said stops being associated with said lever and engageable with the other of said stops to limit the extent of movement of said member, and a handle movably mounted on said lever and connected with one of said stops for adjusting the position of the latter and thereby changing the terminal position of said member.

46. In a device of the class described, the combination of a power actuated movable member, a manually operable control lever associated therewith and shiftable from a neutral position to effect a movement of said member in a certain direction, a handle mounted on said lever and optionally movable relative thereto, stop means attached to said handle and operative to engage cooperative stop means to control the actuation of said lever and thus to limit the extent of movement of said power actuated member, said stop means being shiftable by moving said handle, thereby changing the terminal position of said member.

47. In a device of the class described, the combination of a power actuated movable member, a manually operable control lever associated therewith and shiftable from a neutral position to effect a movement of said member in a certain direction, a handle mounted on said lever and optionally movable relative thereto, stop means on said member, and cooperative stop means connected to said handle and shiftable relative to said first mentioned stop means by moving said handle relative to said lever, thereby changing the terminal position of said member.

48. In a device of the class described, the combination of a power actuated movable member, a control lever associated therewith and swingable from a neutral position to effect a movement of said member in a certain direction, said control lever comprising a pair of relatively movable handles mounted for swinging movement about an axis and disengageable means for normally holding said handles together to swing as a unit, stop means attached to one of said handles and shiftable relative to said control lever by moving said handles relative to each other with said holding means disengaged, and a second stop means engageable with said shiftable stop means when said lever is out of said neutral position to limit the extent of movement of said member.

49. In a device of the class described, the combination of a power actuated movable member, a control lever associated therewith and swingable from a neutral position to effect a movement of said member in a certain direction, said control lever comprising a pair of relatively movable handles mounted for swinging movement about an axis and disengageable means for normally holding said handles together to swing as a unit, stop means attached to one of said handles and shiftable relative to said control lever by disengaging said holding means and moving said one handle relative to the other, and a second stop means connected to said member and movable therewith into engagement with said shiftable stop means to return the lever to said neutral position to stop the movement of said member.

50. In hydraulic mechanism, the combination of a pair of cooperative cylinder and piston members movable relative to each other, a control lever associated therewith and shiftable from a neutral position to effect a relative movement of said members in a certain direction, a handle mounted on said lever and movable relative thereto, means for normally holding said handle in fixed position on said lever for shifting movement therewith, stop means attached to said handle and shiftable relative to said lever by moving said handle with respect to the latter, and a second stop means connected to one of said members and movable therewith into engagement with said shiftable stop means to return the lever to said neutral position to stop the relative movement of said piston and cylinder members.

51. In a device of the class described, the combination of a power actuated movable member, a manually operable control lever associated therewith and pivotally supported to swing from a neutral position to effect a movement of said member in a certain direction, a limit adjusting lever pivotally connected with said control lever and optionally swingable independently thereof, disengageable means normally securing said levers together to swing as a unit, and stop means attached to said power actuated member engageable with said adjusting lever for returning said control lever to said neutral position.

52. In hydraulic mechanism, the combination of a pair of cooperative cylinder and piston members movable relative to each other, a valve control lever associated therewith pivotally supported to swing from a neutral position to effect a relative movement of said members in a certain direction, a limit adjusting lever pivotally connected with said control lever and swingable relative thereto, a rack attached to said control lever and engageable with said adjusting lever to secure said levers together for movement as a unit, a stop attached to said adjusting lever and shiftable thereby relative to said control lever, and a stop attached to one of said cylinder and position members and movable thereby into engagement with said first stop for returning said control lever to neutral position to stop the relative movement of said cylinder and piston members.

53. In hydraulic mechanism the combination of a power actuated movable member, a valve control lever associated therewith and pivotally supported to swing from a neutral position to effect a movement of said member in a certain direction, a limit adjusting lever pivotally supported adjacent said valve control lever to swing in a plane parallel to the plane of movement of said valve control lever, a rack attached to one of said levers and engageable with the other of said levers to secure said levers together for movement together, a stop attached to said adjusting lever and shiftable thereby relative to said valve control lever when the levers are disengaged from each other, and a stop attached to said movable member and movable thereby into engagement with said first stop for returning said valve control lever to neutral position to stop the movement of said member.

54. In a motor vehicle having an operator's station including control apparatus for said vehicle, the combination of an implement mounted separate from the operator's station on said vehicle by means providing for relative movement between the implement and tractor, power lift mechanism actuated by the vehicle motor for moving said implement, a manually operable control lever associated with said mechanism and pivotally supported at said operator's station, said lever being swingable from a neutral position to effect a movement of said power lift mechanism to shift said implement in a certain direction, a pair of interengageable stops, one of said stops being associated with said control lever and engageable with the other of said stops to limit the movement of said power lift mechanism to stop said implement in a certain terminal position relative to the vehicle, and a limit adjusting lever mounted at said operator's station for adjusting the position of one of said stops for adjustably determining said terminal position.

55. In a motor vehicle having an operator's station including control apparatus for said vehicle, the combination of an implement mounted separate from the operator's station on said vehicle by means providing for relative movement between the implement and tractor, power lift mechanism actuated by the vehicle motor for moving said implement, a manually operable control lever associated with said mechanism and pivotally supported at said operator's station, said lever being swingable from a neutral position to effect a movement of said power lift mechanism to shift said implement in a certain direction, a pair of stop means connected with said control lever and said power lift mechanism, respectively, and interengageable during movement of the latter to return said control lever to said neutral position when the implement is moved to a predetermined terminal position relative to the vehicle, and a limit adjusting lever pivotally mounted at said operator's station and connected with one of said stop means to adjust the point of engagement relative to the working range of the power lift mechanism for determining the terminal position of said implement.

56. In a motor vehicle having an operator's station including control apparatus for said vehicle, the combination of an implement mounted separate from the operator's station on said vehicle by means providing for relative movement between the implement and tractor, hydraulic power lift mechanism actuated by the vehicle motor for moving said implement, a manually operable valve control handle associated with said mechanism and supported at said operator's station, said handle being movable from a neutral position to effect a movement of said power lift mechanism to shift said implement in a certain direction, a limit adjusting handle mounted at said operator's station adjacent said valve control handle and detachably connected thereto for movement therewith but optionally movable independently of the latter, stop means attached to said limit adjusting handle and shiftable relative to said control handle by moving said limit adjusting handle independently of said control handle, and a second stop means connected with said power lift mechanism and engageable with said shiftable stop means during movement of said power lift mechanism when said control handle is out of said neutral position, to determine the terminal position of said implement relative to said tractor.

THEOPHILUS BROWN.